(12) United States Patent
Tcai et al.

(10) Patent No.: US 12,438,491 B2
(45) Date of Patent: Oct. 7, 2025

(54) DOUBLE-REFERENCE PULSE-WIDTH MODULATION FOR TORQUE MINIMIZATION OF AC MACHINES

(71) Applicant: Huawei Digital Power Technologies Co., Ltd., Shenzhen (CN)

(72) Inventors: Anatolii Tcai, Nuremberg (DE); Piniwan Thiwanka Bandara Wijekoon, Nuremberg (DE)

(73) Assignee: Huawei Digital Power Technologies Co., Ltd., Shenzhen (CN)

( * ) Notice: Subject to any disclaimer, the term of this patent is extended or adjusted under 35 U.S.C. 154(b) by 168 days.

(21) Appl. No.: 18/463,952

(22) Filed: Sep. 8, 2023

(65) Prior Publication Data

US 2023/0421088 A1    Dec. 28, 2023

Related U.S. Application Data

(63) Continuation of application No. PCT/EP2021/055877, filed on Mar. 9, 2021.

(51) Int. Cl.
*H02P 21/05*  (2006.01)
*H02M 7/5395*  (2006.01)
(Continued)

(52) U.S. Cl.
CPC ........ *H02P 27/085* (2013.01); *H02M 7/5395* (2013.01); *H02P 21/04* (2013.01); *H02P 23/03* (2013.01); *H02P 27/14* (2013.01)

(58) Field of Classification Search
CPC ........ H02P 27/085; H02P 21/04; H02P 23/03; H02P 27/14; H02P 9/00; H02P 21/05;
(Continued)

(56) References Cited

U.S. PATENT DOCUMENTS 8,890,450 B2    11/2014  Maekawa
10,574,154 B1 *  2/2020  Qiao ................ H02M 7/53871
(Continued)

FOREIGN PATENT DOCUMENTS

CN    101388595 B    2/2011
CN    106026072 B    9/2018

OTHER PUBLICATIONS

Alsofyani, Ibrahim M et al., "Enhanced Performance of Constant Frequency Torque Controller-Based Direct Torque Control of Induction Machines with Increased Torque-Loop Bandwidth," IEEE Transactions On Industrial Electronics, Dec. 2020, 12 pages, vol. 67, No. 12, IEEE Xplore.

(Continued)

*Primary Examiner* — Muhammad S Islam
(74) *Attorney, Agent, or Firm* — Slater Matsil, LLP

(57) ABSTRACT

A method for generating a set of pulse-width modulation control signals for a multi-level power converter. The method includes generating a base reference signal for each of three or more reference phases and determining a maximum reference and minimum reference. The method includes calculating a reference sum of the maximum reference and the minimum reference and generating a first offset and a second offset based on the reference sum. The method includes for each of the three reference phases generating an upper PWM output and a lower PWM output. The method includes combining the upper PWM output and lower PWM output to generate a multi-level PWM control signal for the reference phase and outputting a set of multi-level PWM control signals generated for the three or more reference phases.

20 Claims, 11 Drawing Sheets

(51) Int. Cl.
H02P 21/04 (2006.01)
H02P 23/03 (2006.01)
H02P 27/08 (2006.01)
H02P 27/14 (2006.01)

(58) Field of Classification Search
CPC ..... H02P 23/04; H02M 7/5395; H02M 7/483; H02M 7/00
See application file for complete search history.

(56) References Cited

U.S. PATENT DOCUMENTS

| | | | | |
|---|---|---|---|---|
| 11,581,820 | B1* | 2/2023 | Mekonnen | H02M 7/53871 |
| 11,682,983 | B2* | 6/2023 | Tamasas Elrais | H02M 1/0095 |
| | | | | 307/82 |
| 2018/0217902 | A1* | 8/2018 | Wang | H02M 7/483 |
| 2021/0067066 | A1* | 3/2021 | Takahashi | H02P 5/50 |

OTHER PUBLICATIONS

Nguyen, The Dung et al., "Extended Double Carrier PWM Strategy Dedicated to RMS Current Reduction in DC Link Capacitors of Three-Phase Inverters," IEEE Transactions on Power Electronics, Jan. 2014, 11 pages, vol. 29, No. 1, IEEE Xplore.

Bhaskar, Mahajan Sagar et al., "Investigation of a Transistor Clamped T-Type Multilevel H-Bridge Inverter With Inverted Double Reference Single Carrier PWM Technique for Renewable Energy Applications," IEEE Access, Jul. 29, 2020, 19 pages.

An, Sang-Won et al., "Optimized Space-Vector Modulation to Reduce Neutral Point Current for Extending Capacitor Lifetime in Three-Level Inverters," IEEE Access, Apr. 24, 2020, 9 pages.

Rashid, Muhammad M. "Power Electronics Handbook," https://www.sciencedirect.com/book/9780128114070/power-electronics-handbook, 2018, English Abstract, 2 pages, Fourth Edition, Elsevier Inc.

Adase, Leticia Aseye et al., "Predictive Torque Control With Simple Duty-Ratio Regulator of PMSM for Minimizing Torque and Flux Ripples," IEEE Access, Dec. 5, 2019, 9 pages, vol. 8.

Wang, Xuchen et al., "Selective Torque Harmonic Elimination for Dual Three-Phase PMSMs Based on PWM Carrier Phase Shift," IEEE Transactions on Power Electronics, Dec. 2020, 15 pages, vol. 35, No. 12, IEEE Xplore.

Cho, Yongsoo et al., "Torque-Ripple Reduction and Fast Torque Response Strategy for Predictive Torque Control of Induction Motors," IEEE Transaction on Power Electronics, Mar. 2018, 13 pages, vol. 33, No. 3, IEEE Xplore.

Jia, Hongyun et al., "Torque Ripple Suppression in Flux-Switching PM Motor by Harmonic Current Injection Based on Voltage Space-Vector Modulation," IEEE Transactions on Magnetics, Jun. 2010, 4 pages, vol. 46, No. 6, IEEE Xplore.

* cited by examiner

DOUBLE-REFERENCE PULSE-WIDTH MODULATION FOR TORQUE MINIMIZATION OF AC MACHINES

CROSS-REFERENCE TO RELATED APPLICATIONS

This application is a continuation of International Application No. PCT/EP2021/055877, filed on Mar. 9, 2021, the disclosure of which is hereby incorporated by reference in its entirety.

TECHNICAL FIELD

The present disclosure relates generally to the field of alternating current (AC) machines and more specifically, to a method for generating control signals for a multi-level power converter, a controller device for the multi-level power converter and AC machine drives.

BACKGROUND

Generally, alternating current (AC) machines are considered required assets in various applications, such as power generation, transportation and traction applications like electric vehicles, and the like, as their reliability is much higher than that of the DC machines. In such applications, it is required to control speed of a motor (e.g. an AC motor or a direct current (DC) motor) to a given reference. Various methods have been proposed to control the speed of the motor to the given reference. Initially, a conventional method of voltage-frequency control is proposed to control the speed of the motor to the given reference by changing frequency of a supplied voltage and keeping a ratio between the supplied voltage and the frequency applied to the motor. Another conventional method of direct torque control (DTC) is devised by calculating a magnetic flux and torque of the motor based on measured parameters, such as voltage and current at the motor terminals. The conventional DTC method includes a direct control of the magnetic flux and torque of the motor, but due to a finite number of states of a conventional power converter, torque ripple is very high. Thus, the conventional DTC method is rarely used. Thereafter, another conventional method of field-oriented control (FOC) is proposed to control the speed of the motor to the given reference. The conventional FOC method includes a separate control of the magnetic flux and torque of the motor, therefore, achieves the required speed of the motor with partial ease.

The conventional power converter provides the required voltage and frequency which can be regulated by use of pulse-width modulation (PWM). An input DC voltage of the conventional power converter is converted into an AC sine-wave output voltage by fast switching of power transistors. Such type of the conventional power converter is also known as a conventional voltage-source inverter (VSI), for example, a conventional two-level VSI. The AC sine-wave output voltage generated by the conventional power converter (or the conventional VSI) is further converted into an AC output current by use of a low-pass filter. In the conventional AC machines, stator inductances and resistances act as the low-pass filter. Furthermore, the torque of the motor is directly proportional to the AC output current. Therefore, any ripple or oscillation of the torque is then translated into ripple or oscillation in the current (and vise versa), so the current quality is directly related to the torque quality and the torque quality is responsible for smooth operation of the conventional AC machines with decreased vibration or jerking. The conventional multilevel VSIs have low modulation index (MI) when a connected AC machine is operated at a low speed region. The low MI (e.g. MI<0.5) results into an increased current ripple which further results into an increased torque ripple. The increased torque ripple results into vibration and jerking of the conventional AC machines at the low speed region. Therefore, the vibration and jerking of the conventional AC machines become unavoidable at the low speed region.

Currently, certain attempts have been made to improve the current quality and hence, the torque quality of the conventional AC machines at the low speed region. In an example, a conventional three-level VSI (3L-VSI) may be used in power electronics applications including motor applications or automotive applications due to partially improved current quality and efficiency. The two generally used topologies of the conventional 3L-VSI are named as neutral point clamped (NPC) and T-type VSI. To further improve the current quality in the conventional 3L-VSI, a sine wave reference may be used with injected harmonics and this method is known as space-vector PWM (SVPWM). The SVPWM method manifests high MI value, therefore, the current quality is slightly improved in comparison to a conventional sine-wave PWM. The current quality of the conventional 3L-VSI with the SVPWM method can further be improved by increasing the frequency (or switching frequency) of PWM, however, this combination has certain limitations. For example, the power transistors of the conventional 3L-VSI have limited turn-on/off speed, therefore, a maximum switching frequency is limited by the power transistors. Moreover, high switching frequency causes higher switching losses which further results into a reduced efficiency. Therefore, despite of using the conventional 3L-VSI with the SVPWM and increased switching frequency, the performance of the conventional AC machines at the low speed region (or with the low MI) is very low which further results into vibrations and jerking of the conventional AC machines. Thus, there exists a technical problem of vibrations and jerking of the conventional AC machines at the low speed region.

Therefore, in light of the foregoing discussion, there exists a need to overcome the aforementioned drawbacks associated with the conventional methods of operating the conventional AC machines at the low speed region.

SUMMARY

The present disclosure provides a method for generating control signals for a multi-level power converter, a controller device for the multi-level power converter and AC machine drives. The present disclosure provides a solution to the existing problem of vibrations and jerking of the conventional AC machines when operated at a low speed. An objective of the present disclosure is to provide a solution that overcomes at least partially the problems encountered in the prior art and provides an improved method for generating control signals for a multi-level power converter, a controller device for the multi-level power converter and AC machine drives that manifest smooth operation at the low speed region with reduced vibration or jerking.

One or more objectives of the present disclosure is achieved by the solutions provided in the enclosed independent claims. Advantageous implementations of the present disclosure are further defined in the dependent claims.

In one aspect, the present disclosure provides a computer implemented method for generating a set of pulse-width modulation (PWM) control signals for a multi-level power converter. The method comprises generating a base reference signal for each of three or more reference phases. The method further comprises determining a maximum reference (max) and minimum reference (min) based on the base reference signals and calculating a reference sum of the maximum reference and the minimum reference. The method further comprises generating a first offset, calculated as 1−max when the reference sum is positive and −1-min when the reference sum is negative. The method further comprises generating a second offset, calculated as −1-min when the reference sum is positive and 1−max when the reference sum is negative. For each of the three reference phases, the method further comprises generating an upper reference, calculated by adding the first offset to the base reference signal when the signal is positive and adding the second offset when the signal is negative. For each of the three reference phases, the method further comprises generating a lower reference, calculated by adding the second offset to the base reference signal when the signal is positive and adding the first offset when the signal is negative. For each of the three reference phases, the method further comprises comparing the upper reference to a triangular upper carrier signal to generate an upper PWM output and comparing the lower reference to a triangular lower carrier signal to generate a lower PWM output. For each of the three reference phases, the method further comprises combining the upper PWM output and lower PWM output to generate a multi-level PWM control signal for the reference phase. The method further comprises outputting a set of multi-level PWM control signals generated for the three or more reference phases to the multi-level power converter.

The disclosed method provides a smooth operation of an AC machine at a low speed region with reduced vibration or jerking. The disclosed method uses two different reference voltages (i.e. the upper reference and the lower reference) with respect to each of the three or more reference phases in order to generate the set of multi-level PWM control signals for the multi-level power converter. Therefore, the method manifests an improved performance (i.e. an improved current quality and torque quality or reduced current ripples and torque ripples) of the AC machine when operated at the low speed region with reduced vibration or jerking. In contrast to a conventional SVPWM method which uses a single reference voltage in order to generate PWM control signals for a conventional power converter and hence, manifests low performance (i.e. reduced current quality and torque quality or more current ripples and torque ripples) of a conventional AC machine when operated at the low speed region.

In an implementation form, calculating the maximum reference comprises comparing a first base reference signal for a first reference phase to a second base reference signal for a second reference phase. If the first base reference signal is larger, comparing the first base reference signal with a third base reference signal for a third reference phase and returning the larger value and if the second base reference signal is larger, comparing the second base reference signal with the third base reference signal and returning the larger value.

The maximum reference calculated by comparison of each of the base reference signals with respect to each other results into a more precise value of the maximum reference.

In a further implementation form, calculating the minimum reference comprises comparing a first base reference signal for a first reference phase to a second base reference signal for a second reference phase. If the first base reference signal is smaller, comparing the first base reference signal with a third base reference signal for a third reference phase and returning the smaller value and if the second base reference signal is smaller, comparing the second base reference signal with the third base reference signal and returning the smaller value.

The minimum reference calculated by comparison of each of the base reference signals with respect to each other results into a more precise value of the minimum reference.

In a further implementation form, the reference phases are 0 degrees, 120 degrees and 240 degree for 3 phase machines.

The references phases are used to generate an auxiliary phase which further causes rotation of an AC motor comprised by an AC machine.

In a further implementation form, the base signal is a sine wave.

It is advantageous to use the sine wave as the base signal to reduce switch over peaks.

In a further implementation form, the base signal is a space vector signal.

It is advantageous to use the space vector signal as the base signal to incorporate simplicity.

In a further implementation form, generating the base reference signals comprises receiving a speed reference and a torque reference for an AC machine drive and determining an amplitude for the base reference signals based on the received speed reference.

The speed reference is used to determine the amplitude of the base reference signals with more precision.

In another aspect, the present disclosure provides a computer-readable medium comprising instructions which, when executed by a processor, cause the processor to execute the method.

The processor achieves all the advantages and effects of the method of the present disclosure after execution of the method.

In a yet another aspect, the present disclosure provides a controller device for a multi-level power converter, configured to generate a set of multi-level pulse-width modulation (PWM) control signals by executing the method and output the generated set of multi-level PWM control signals to the multi-level power converter.

The controller device enables a smooth operation of an AC machine drive at a low speed region without any change in topology or switching frequency of the multi-level power converter.

In a yet another aspect, the present disclosure provides an alternating current (AC) machine drive comprising an AC motor with three or more phase input terminals. The AC machine drive further comprises a direct current (DC) input voltage source and a multi-level voltage source inverter (VSI) configured to receive an input DC voltage from the DC input voltage source and generate an AC driving signal for each of the three or more phase input terminals. The AC machine drive further comprises the controller device configured to output a set of multi-level pulse-width modulation (PWM) control signals to the multi-level VSI.

The AC machine drive comprising the AC motor with three or more phase input terminals is used for conversion of an electrical energy into a rotational magnetic energy without overheating, braking or degeneration. Moreover, the disclosed AC machine drive operates smoothly at a low speed region without any vibration or jerking.

In an implementation form, the multi-level VSI is one of a neutral-point clamped VSI, a T-type VSI, a flying capacitor VSI.

The multi-level VSI is one of the neutral-point clamped VSI, the T-type VSI, or the flying capacitor VSI to provide the smooth operation of the AC machine drive at the low speed region without any change in switching frequency.

In a yet another aspect, the present disclosure provides an alternating current (AC) machine drive comprising an AC generator with three or more phase output terminals. The AC machine drive further comprises a direct current (DC) output voltage source and a multi-level rectifier, configured to receive an input AC voltage from each of the three or more phase output terminals of the AC generator and generate an output DC voltage at the DC output voltage source. The AC machine drive further comprises the controller device configured to output a set of multi-level pulse-width modulation (PWM) control signals to the multi-level rectifier.

The AC machine drive comprising the AC generator with three or more phase output terminals is used for conversion of a rotational magnetic energy into an electrical energy without overheating, braking or degeneration. Moreover, the disclosed AC machine drive operates smoothly at a low speed region with reduced vibration or jerking.

In an implementation form, the multi-level rectifier is one of a Vienna Rectifier, T-type Rectifier, Neutral-Point Clamped Rectifier, Active Neutral-Point Clamped Rectifier, Flying Capacitor Rectifier.

The multi-level rectifier may be one of the Vienna Rectifier, T-type Rectifier, Neutral-Point Clamped Rectifier, Active Neutral-Point Clamped Rectifier, or Flying Capacitor Rectifier to provide the smooth operation of the AC machine drive at the low speed region without any change in switching frequency.

It is to be appreciated that all the aforementioned implementation forms can be combined.

It has to be noted that all devices, elements, circuitry, units and means described in the present application could be implemented in the software or hardware elements or any kind of combination thereof. All steps which are performed by the various entities described in the present application as well as the functionalities described to be performed by the various entities are intended to mean that the respective entity is adapted to or configured to perform the respective steps and functionalities. Even if, in the following description of specific embodiments, a specific functionality or step to be performed by external entities is not reflected in the description of a specific detailed element of that entity which performs that specific step or functionality, it should be clear for a skilled person that these methods and functionalities can be implemented in respective software or hardware elements, or any kind of combination thereof. It will be appreciated that features of the present disclosure are susceptible to being combined in various combinations without departing from the scope of the present disclosure as defined by the appended claims.

Additional aspects, advantages, features and objects of the present disclosure would be made apparent from the drawings and the detailed description of the illustrative implementations construed in conjunction with the appended claims that follow.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those in the art will understand that the drawings are not to scale. Wherever possible, like elements have been indicated by identical numbers.

Embodiments of the present disclosure will now be described, by way of example only, with reference to the following diagrams wherein.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF ILLUSTRATIVE EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practicing the present disclosure are also possible.

Figure 1A:
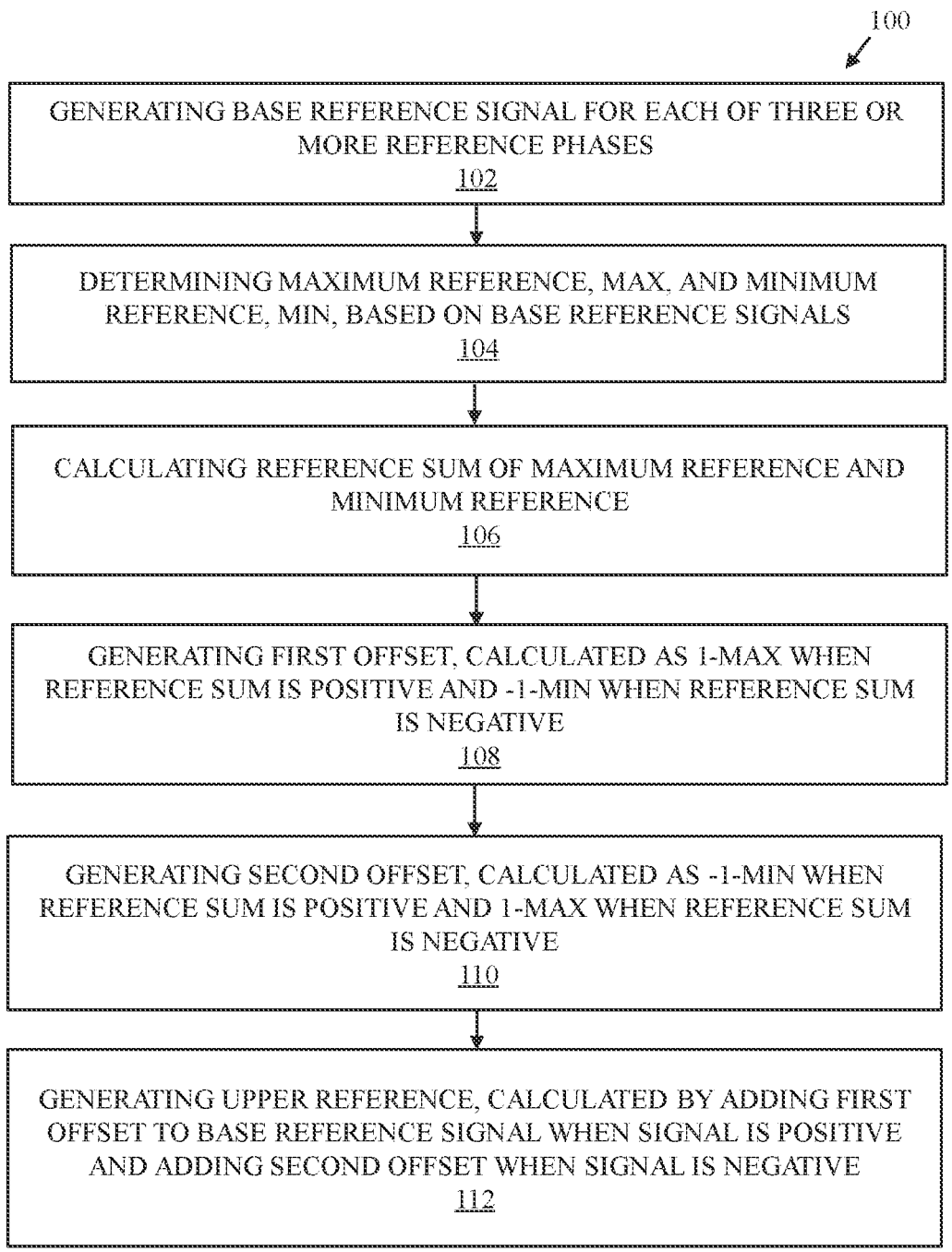
FIGS. 1A and 1B collectively is a flowchart of a method for generating a set of pulse-width modulation (PWM) control signals for a multi-level power converter, in accordance with an embodiment of the present disclosure.
Figure 1B:
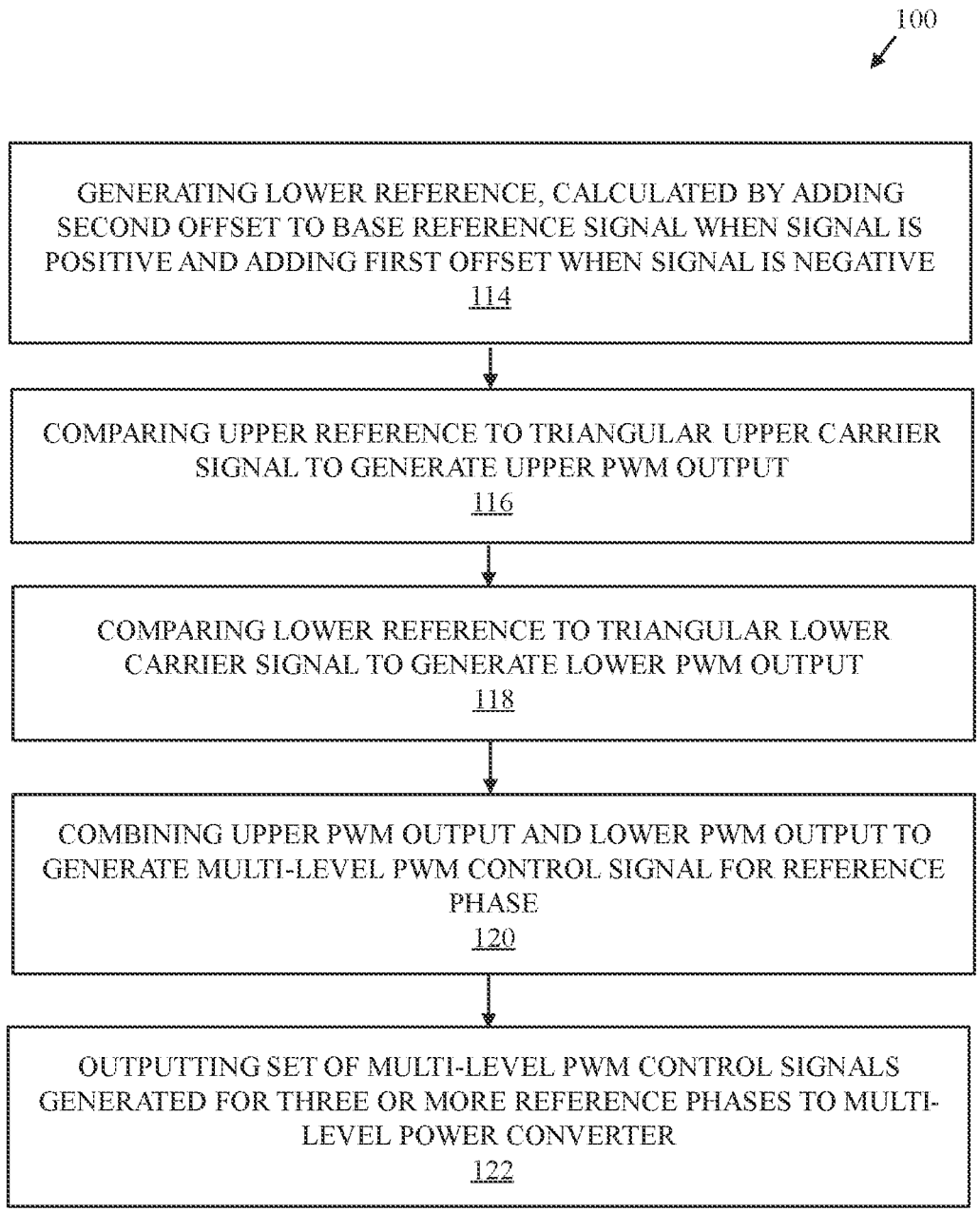

FIGS. 1A and 1B collectively is a flowchart of a method for generating a set of pulse-width modulation (PWM) control signals for a multi-level power converter, in accordance with an embodiment of the present disclosure. With reference to FIGS. 1A and 1B, there is shown a method 100 for generating a set of pulse-width modulation (PWM) control signals for a multi-level power converter. The method 100 includes steps 102 to 122 (steps 102-112 of the method 100 are shown in FIG. 1A and steps 114-122 are shown in FIG. B). The method 100 is executed by a processor of a controller device, described in detail, for example, in FIG. 2.

The present disclosure provides a computer implemented method (i.e. the method 100) for generating a set of pulse-width modulation, PWM, control signals for a multi-level power converter, the method 100 comprising:
  generating a base reference signal for each of three or more reference phases;
  determining a maximum reference, max, and minimum reference, min, based on the base reference signals;
  calculating a reference sum of the maximum reference and the minimum reference;
  generating a first offset, calculated as 1−max when the reference sum is positive and −1−min when the reference sum is negative;
  generating a second offset, calculated as −1−min when the reference sum is positive and 1−max when the reference sum is negative;
  for each of the three reference phases:
  generating an upper reference, calculated by adding the first offset to the base reference signal when the signal is positive and adding the second offset when the signal is negative;
  generating a lower reference, calculated by adding the second offset to the base reference signal when the signal is positive and adding the first offset when the signal is negative;
  comparing the upper reference to a triangular upper carrier signal to generate an upper PWM output;
  comparing the lower reference to a triangular lower carrier signal to generate a lower PWM output; and
  combining the upper PWM output and lower PWM output to generate a multi-level PWM control signal for the reference phase; and
  outputting a set of multi-level PWM control signals generated for the three or more reference phases to the multi-level power converter.

With reference to FIG. 1A, the method 100 is used for generating a set of pulse-width modulation (PWM) control signals for a multi-level power converter. The method 100 corresponds to a modulation method used to generate the set of PWM control signals for the multi-level power converter. The set of PWM control signals are generated by encoding amplitude of a signal (e.g. a sinusoidal signal) into a pulse width of another signal. Generally, the set of PWM control signals are used to control a power that is supplied to various types of electrical devices, such as an AC motor or a DC motor. The set of PWM control signals are used as on or off commands for the multi-level power converter. The multi-level power converter is described in detail, for example, in FIG. 2.

At step 102, the method 100 comprises generating a base reference signal for each of three or more reference phases. In an example, the base reference signal may be a sinusoidal signal or a sine wave for each of three or more references phases.

At step 104, the method 100 further comprises determining a maximum reference (max) and minimum reference (min) based on the base reference signals. The base reference signal(s) for each of three or more references phases are compared with each other to determine the maximum reference (max) and the minimum reference (min).

At step 106, the method 100 further comprises calculating a reference sum of the maximum reference and the minimum reference. The calculated reference sum (i.e. max+min) of the maximum reference (max) and the minimum reference (min) is further used for obtaining two offsets.

At step 108, the method 100 further comprises generating a first offset, calculated as 1−max when the reference sum is positive and −1−min when the reference sum is negative. In a case, if the reference sum is positive (i.e. max+min>0) then, the first offset (i.e. offset 1) is 1−max, else (i.e. max+min<0), the first offset (i.e. offset 1) is −1−min.

At step 110, the method 100 further comprises generating a second offset, calculated as −1−min when the reference sum is positive and 1−max when the reference sum is negative. In another case, if the reference sum is positive (i.e. max+min>0) then, the second offset (i.e. offset 2) is −1−min, else (i.e. max+min<0), the second offset (i.e. offset 2) is 1−max.

At step 112, the method 100 further comprises for each of the three reference phases, generating an upper reference, calculated by adding the first offset to the base reference signal when the signal is positive and adding the second offset when the signal is negative. In an example, the base reference signal(s) for each of the three references phases may be represented as A*, B* and C*, respectively. The step 112 may be described with respect to the one base reference signal, for example, A*. When the base reference signal (i.e. A*) is positive, the upper reference (i.e. Atop−AT) is generated by adding the first offset (i.e. offset 1) to the base reference signal (i.e. A*) according to the equation 1

$$AT = A^* + \text{offset1} \quad (1)$$

When the base reference signal (i.e. A*) is negative, the upper reference (i.e. AT) is generated by adding the second offset (i.e. offset 2) to the base reference signal (i.e. A*) according to the equation 2.

$$AT = A^* + \text{offset2} \quad (2)$$

Similar to the base reference signal A*, the upper reference (i.e. Btop-BT, Ctop-CT) is generated for the base reference signals B* and C*, respectively.

Now, referring to FIG. 1B, at step 114, the method 100 further comprises for each of the three reference phases, generating a lower reference, calculated by adding the second offset to the base reference signal when the signal is positive and adding the first offset when the signal is negative. Similar to the step 112, the step 114 is also described with respect to the base reference signal, A*. When the base reference signal (i.e. A*) is positive, the lower reference (i.e. Abottom−AB) is generated by adding the second offset (i.e. offset 2) to the base reference signal (i.e. A*) according to the equation 3

$$AB = A^* + \text{offset2} \quad (3)$$

Similarly, when the base reference signal (i.e. A*) is negative, the lower reference (i.e. AB) is generated by adding the first offset (i.e. offset 1) to the base reference signal (i.e. A*) according to the equation 4

$$AB = A^* + \text{offset1} \quad (4)$$

Similar to the base reference signal A*, the lower reference (i.e. Bbottom–BB, Cbottom–CB) is generated for the base reference signals B* and C*, respectively. In this way, two different reference voltages (i.e. the upper reference (i.e. AT, BT, CT) and the lower reference (i.e. AB, BB, CB)) are generated for each of the three reference phases. Therefore, due to the two different reference voltages (i.e. the upper reference and the lower reference), the method 100 may also be referred as a double reference PWM (DRPWM).

At step 116, the method 100 further comprises for each of the three reference phases, comparing the upper reference to a triangular upper carrier signal to generate an upper PWM output. For example, the generated upper reference (i.e. AT) for the base reference signal A* is compared with the triangular upper carrier to generate the upper PWM output. Similarly, the generated upper reference (i.e. BT, CT) for the base reference signals, B* and C*, respectively, is compared with the triangular upper carrier to generate the upper PWM output.

At step 118, the method 100 further comprises for each of the three reference phases, comparing the lower reference to a triangular lower carrier signal to generate a lower PWM output. For example, the generated lower reference (i.e. AB) for the base reference signal A* is compared with the triangular lower carrier to generate the lower PWM output. Similarly, the generated lower reference (i.e. BB, CB) for the base reference signals, B* and C*, respectively, is compared with the triangular lower carrier to generate the lower PWM output.

At step 120, the method 100 further comprises for each of the three reference phases, combining the upper PWM output and lower PWM output to generate a multi-level PWM control signal for the reference phase. For example, the upper PWM output and the lower PWM output of the base reference signal (i.e. A*) are combined to generate the multi-level PWM control signal for the reference phase. Similarly, the multi-level PWM control signal is generated for the base reference signals B* and C*, respectively.

At step 122, the method 100 further comprises outputting a set of multi-level PWM control signals generated for the three or more reference phases to the multi-level power converter. The two different reference voltages (i.e. the upper reference and the lower reference) of the base reference signal (i.e. A*) are compared with two different triangular carriers (i.e. the triangular upper carrier and the triangular lower carrier) to produce the set of PWM control signal for the reference phase. Similarly, the set of multi-level PWM control signals may be generated for the three or more reference phases and applied to the multi-level power converter. The ratio between the upper reference (i.e. AT) of the base reference signal (i.e. A*) and the triangular upper carrier is termed as a modulation index (MI). Similarly, the ratio between the lower reference (i.e. AB) of the base reference signal (i.e. A*) and the triangular lower carrier may also be termed as the modulation index (MI).

In accordance with an embodiment, calculating the maximum reference comprises comparing a first base reference signal for a first reference phase to a second base reference signal for a second reference phase. If the first base reference signal is larger, comparing the first base reference signal with a third base reference signal for a third reference phase and returning the larger value. If the second base reference signal is larger, comparing the second base reference signal with the third base reference signal and returning the larger value. For example, in a case, the first base reference signal (i.e. A*) for the first reference phase is compared with the second base reference signal (i.e. B*) for the second reference phase and the first base reference signal (i.e. A*) has larger value. Thereafter, the first base reference signal (i.e. A*) is further compared with the third base reference signal (i.e. C*) for the third reference phase and the first base reference signal (i.e. A*) has larger value on comparison. Then, in such a case, the maximum reference is associated with the first base reference signal (i.e. A*). In another case, if the second base reference signal (i.e. B*) has larger value in comparison to the first base reference signal (i.e. A*), therefore, the second base reference signal (i.e. B*) is further compared with the third base reference signal (i.e. C*) and the second base reference signal (i.e. B*) has larger value on comparison. Then, in such a case, the maximum reference is associated with the second base reference signal (i.e. B*). In a yet another case, if the third base reference signal (i.e. C*) has larger value in comparison to the first base reference signal (i.e. A*) and the second base reference signal (i.e. B*), then, in such a case, the maximum reference is associated with the third base reference signal (i.e. C*).

In accordance with an embodiment, calculating the minimum reference comprises comparing a first base reference signal for a first reference phase to a second base reference signal for a second reference phase. If the first base reference signal is smaller, comparing the first base reference signal with a third base reference signal for a third reference phase and returning the smaller value. If the second base reference signal is smaller, comparing the second base reference signal with the third base reference signal and returning the smaller value. For example, in a case, the first base reference signal (i.e. A*) for the first reference phase is compared with the second base reference signal (i.e. B*) for the second reference phase and the first base reference signal (i.e. A*) has smaller value. Thereafter, the first base reference signal (i.e. A*) is further compared with the third base reference signal (i.e. C*) for the third reference phase and the first base reference signal (i.e. A*) has smaller value on comparison. Then, in such a case, the minimum reference is associated with the first base reference signal (i.e. A*). In another case, if the second base reference signal (i.e. B*) has smaller value in comparison to the first base reference signal (i.e. A*), therefore, the second base reference signal (i.e. B*) is further compared with the third base reference signal (i.e. C*) and the second base reference signal (i.e. B*) has smaller value on comparison. Then, in such a case, the minimum reference is associated with the second base reference signal (i.e. B*). In a yet another case, if the third base reference signal (i.e. C*) has smaller value in comparison to the first base reference signal (i.e. A*) and the second base reference signal (i.e. B*), then, in such a case, the minimum reference is associated with the third base reference signal (i.e. C*).

In accordance with an embodiment, the reference phases are 0 degrees, 120 degrees and 240 degrees. In an implementation, the references phases are 0 degrees, 120 degrees and 240 degrees.

In accordance with an embodiment, the base signal is a sine wave. The base signal (or the base reference signals, such as A*, B*, C*) for each of the three or more references phases is the sine wave or the sinusoidal signal.

In accordance with an embodiment, the base signal is a space vector signal. In an implementation, the base signal (or the base reference signals, such as A*, B*, C*) for each of the three or more references phases may be the space vector signal in order to ease the functioning of an AC machine.

In accordance with an embodiment, generating the base reference signals comprises receiving a speed reference for an AC machine drive and determining an amplitude for the base reference signals based on the received speed reference. The base reference signals (i.e. A*, B* or C*) for each of the three reference phases are generated based on the received speed reference for the AC machine drive. The received speed reference is used to determine the amplitude of the base reference signals (i.e. A*, B* or C*) for each of the three reference phases. The received speed reference for the AC machine drive may also be used to determine the MI to be applied to the multi-level power converter. The received speed reference for the AC machine drive is proportional to the MI. Alternatively, the relation between the received speed reference for the AC machine drive and the MI can also be explained as a relation between a back-electromotive force (EMF) of a motor (e.g. an AC motor or a DC motor) and DC voltage source of the multi-level power converter, according to equation 5

$$MI = 1.73 \times V_{EMF}/V_{DC} \tag{5}$$

where, $V_{EMF}$ is the voltage produced by the motor (i.e. the AC motor or the DC motor), rotating at a certain speed $\omega$ and can be expressed according to equation 6

$$V_{EMF} = \omega \times K_T \tag{6}$$

where, $K_T$ is a motor constant and depends on physical parameters of the AC machine drive and is different for each machine.

The torque for the AC machine drive is proportional to the current and the $K_T$ of the AC machine drive according to equation 7

$$T = I \times K_T \tag{7}$$

In this way, the torque quality of the AC machine drive is directly proportional to the current quality of the VSI or Rectifier.

Thus, the method 100 uses two different reference voltages (i.e. the upper reference (i.e. AT, BT, CT) and the lower reference (i.e. AB, BB, CB)) with respect to each of the three or more reference phases in order to generate the set of multi-level PWM control signals for the multi-level power converter. Therefore, the method 100 manifests an improved performance (i.e. an improved current quality and torque quality) of the AC machine drive when operated at a low speed region with reduced vibration or jerking. In contrast to a conventional SVPWM method which uses a single reference voltage in order to generate PWM control signals for a conventional power converter and hence, manifests low performance (i.e. reduced current quality and torque quality) a conventional AC machine when operated at the low speed region.

The steps 102 to 122 are only illustrative and other alternatives can also be provided where one or more steps are added, one or more steps are removed, or one or more steps are provided in a different sequence without departing from the scope of the claims herein.

Figure 2:
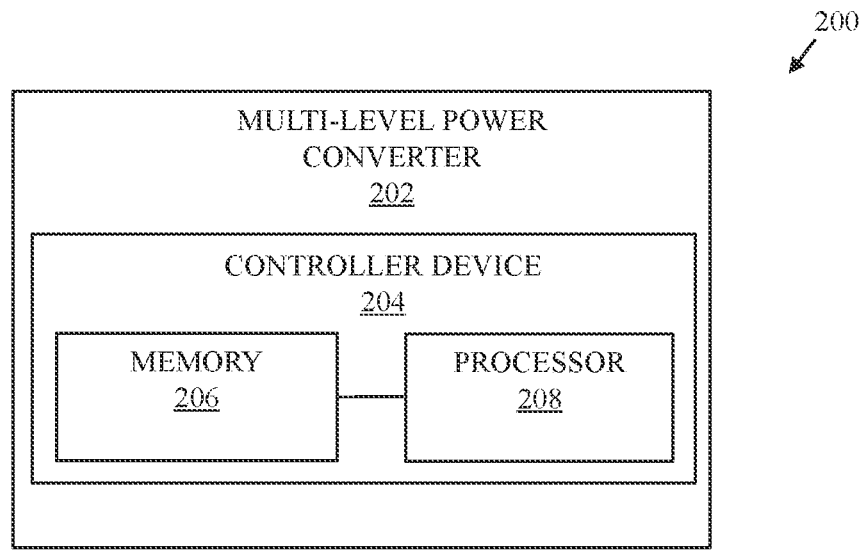
FIG. 2 is a block diagram that illustrates various exemplary components of a multi-level power converter, in accordance with an embodiment of the present disclosure.

FIG. 2 is a block diagram that illustrates various exemplary components of a multi-level power converter, in accordance with an embodiment of the present disclosure. FIG. 2 is described in conjunction with elements from FIGS. 1A and 1B. With reference to FIG. 2 there is shown a block diagram 200 of a multi-level power converter 202. The multi-level power converter 202 includes a controller device 204. The controller device 204 includes a memory 206 and a processor 208.

The multi-level power converter 202 may comprise suitable logic, circuitry, interfaces, and/or code that is configured to vary an output voltage between three or more voltage levels. Therefore, the multi-level power converter 202 may be used for generation of high voltage levels with smaller voltage steps, and therefore improved voltage waveforms with reduced filtering requirements and reduced switching frequency (and consequently reduced switching losses and reduced common mode voltage). In an example, the multi-level power converter 202 may be used in an induction or a synchronous motor drive(s) for various industrial applications, or high voltage DC (HVDC) system, flexible AC transmission systems (FACTS), static VAR compensators (SVC), or static VAR generators (SVG), and the like.

The controller device 204 may comprise suitable logic, circuitry, interfaces, and/or code that is configured to generate a set of multi-level pulse-width modulation (PWM) control signals and output the generated set of multi-level PWM control signals to the multi-level power converter 202. The controller device 204 generates the set of multi-level PWM control signals by executing the method 100 (of FIGS. 1A and 1B).

The memory 206 includes suitable logic, circuitry, or interfaces that is configured to store the instructions executable by the processor 208. Examples of implementation of the memory 206 may include, but are not limited to, Electrically Erasable Programmable Read-Only Memory (EEPROM), Random Access Memory (RAM), Read Only Memory (ROM), Hard Disk Drive (HDD), Flash memory, Solid-State Drive (SSD), or CPU cache memory. The memory 206 may store an operating system or other program products (including one or more operation algorithms) to operate the controller device 204.

The processor 208 includes suitable logic, circuitry, or interfaces that is configured to execute the instructions stored in the memory 206. In an example, the processor 208 may be a general-purpose processor. Other examples of the processor 208 may include, but is not limited to a microprocessor, a microcontroller, a complex instruction set computing (CISC) processor, an application-specific integrated circuit (ASIC) processor, a reduced instruction set (RISC) processor, a very long instruction word (VLIW) processor, a central processing unit (CPU), a state machine, a data processing unit, and other processors or control circuitry. Moreover, the processor 208 may refer to one or more individual processors, processing devices, a processing unit that is part of a machine, such as the controller device 204.

In accordance with an embodiment, a computer-readable medium comprising instructions which, when executed by the processor 208, cause the processor 208 to execute the method 100 (of FIGS. 1A and 1B).

Figure 3:
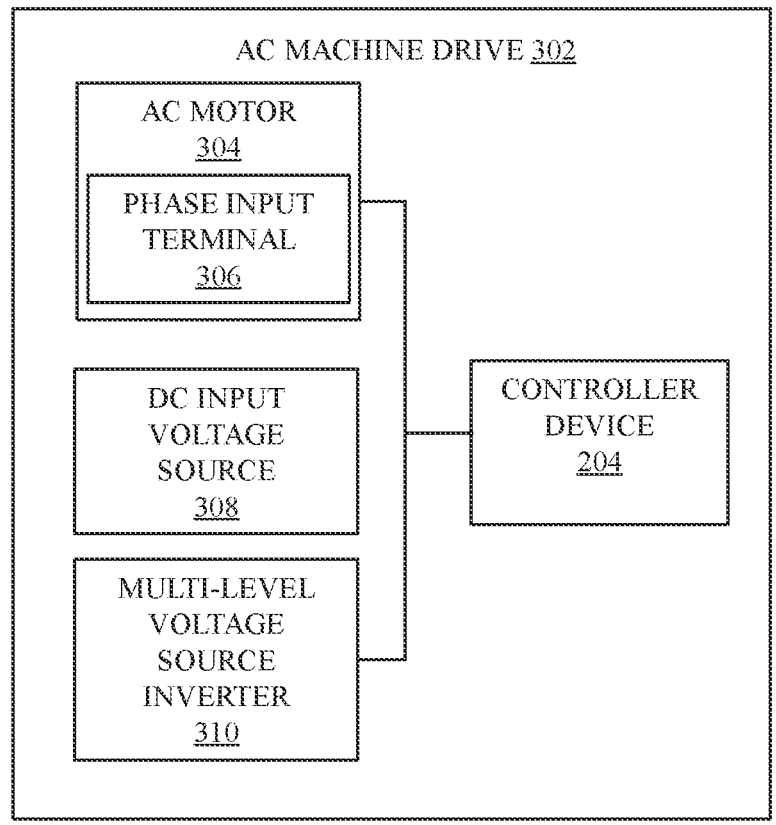
FIG. 3 is a block diagram that illustrates various exemplary components of an alternating current (AC) machine drive, in accordance with an embodiment of the present disclosure.

FIG. 3 is a block diagram that illustrates various exemplary components of an alternating current (AC) machine drive, in accordance with an embodiment of the present disclosure. FIG. 3 is described in conjunction with elements from FIGS. 1A, 1B, and 2. With reference to FIG. 3 there is shown a block diagram 300 of an AC machine drive 302. The AC machine drive 302 includes an AC motor 304 with three or more phase input terminals 306. The AC machine drive 302 further includes a direct current (DC) input voltage source 308, a multi-level voltage source inverter (VSI) 310 and the controller device 204.

The AC machine drive 302 may include suitable logic, circuitry, or interfaces that is configured to precisely operate and control the speed, torque and direction of the AC motor 304. In an example, the AC machine drive 302 may be used to change the speed of the AC motor 304 by changing voltage and frequency supplied to the AC motor 304.

The AC motor 304 with three or more phase input terminals 306 may also be referred to as a rotating electrical machine that is designed to operate at three or more phases supply voltage as input and produce mechanical energy (or rotation) as output.

The DC input voltage source 308 may include suitable logic, circuitry, or interfaces that is configured to provide a constant DC output voltage across its terminals. In an example, the DC input voltage source 308 may receive a higher or a lower input voltage than a desired input voltage, in such a case, the DC input voltage source 308 may comprise a circuitry to change the higher or the lower input voltage in order to generate a desired output voltage. The output of the DC input voltage source 308 is provided as an input to the multi-level voltage source inverter (VSI) 310 and thus, is referred to as the DC input voltage source 308.

The multi-level VSI 310 may include suitable logic, circuitry, or interfaces that is configured to receive an input DC voltage from the DC input voltage source 308 and generate an AC driving signal for each of the three or more phase input terminals 306.

In accordance with an embodiment, the multi-level VSI 310 is one of a neutral-point clamped VSI, a T-type VSI, a flying capacitor VSI. The multi-level VSI 310 may be one of the neutral-point clamped VSI, the T-type VSI, or the flying capacitor VSI to provide the smooth operation of the AC machine drive 302 at the low speed region without any change in switching frequency. The multi-level VSI 310 from one of the neutral-point clamped VSI, the T-type VSI, or the flying capacitor VSI does not require any change in switching frequency when used with the method 100 (of FIGS. 1A and 1B).

The controller device 204 is further configured to output a set of multi-level PWM control signals to the multi-level VSI 310 comprised by the AC machine drive 302.

Figure 4:
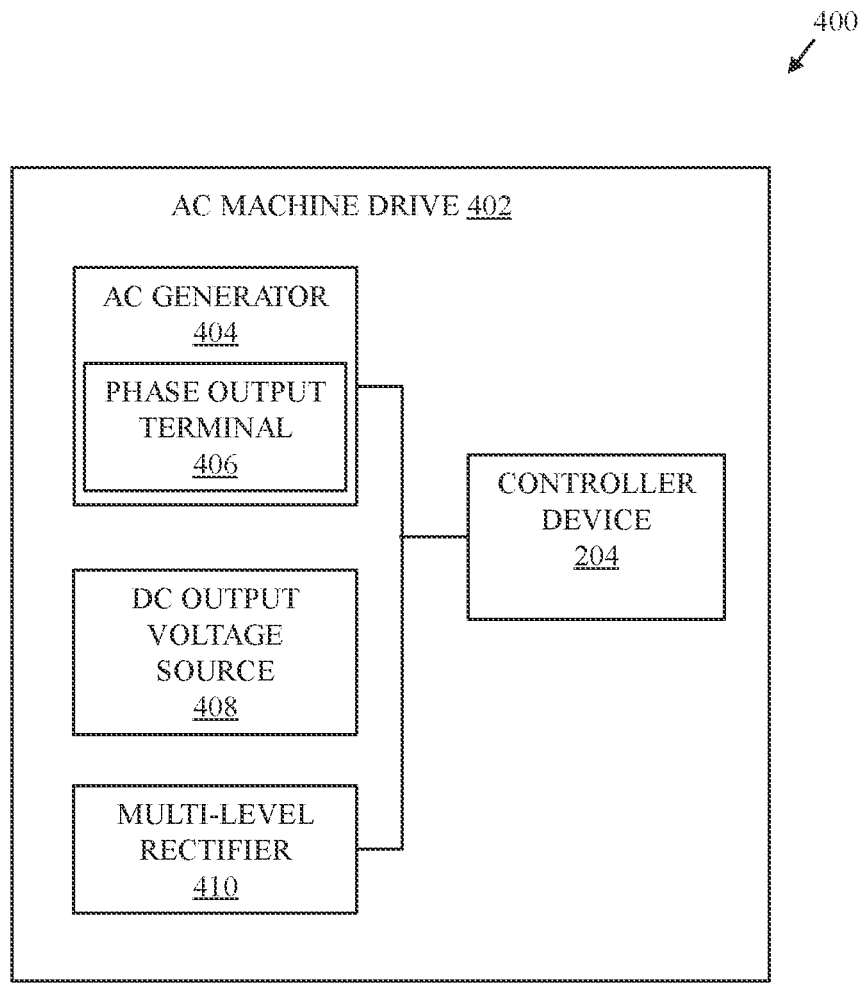
FIG. 4 is a block diagram that illustrates various exemplary components of an AC machine drive, in accordance with another embodiment of the present disclosure.

FIG. 4 is a block diagram that illustrates various exemplary components of an alternating current (AC) machine drive, in accordance with another embodiment of the present disclosure. FIG. 4 is described in conjunction with elements from FIGS. 1A, 1B, 2 and 3. With reference to FIG. 4 there is shown a block diagram 400 of an AC machine drive 402. The AC machine drive 402 includes an AC generator 404 with three or more phase output terminals 406. The AC machine drive 402 further includes DC output voltage source 408, a multi-level rectifier 410 and the controller device 204.

The AC machine drive 402 may include suitable logic, circuitry, or interfaces that is configured to precisely operate and control the speed, torque and direction of the AC generator 404.

The AC generator 404 with three or more phase output terminals 406 may also be referred to as an electrical machine that is designed to operate or receive mechanical energy (i.e. rotation energy for rotor) as input and produce an electrical energy of three or more phases as output.

The DC output voltage source 408 may include suitable logic, circuitry, or interfaces that is configured to provide a fixed DC output voltage across its terminals. In an example, the DC output voltage source 408 may receive varying DC input voltage from the multi-level rectifier 410 and provides a constant DC output voltage.

The multi-level rectifier 410 may include suitable logic, circuitry, or interfaces that is configured to receive an input AC voltage from each of the three or more phase output terminals 406 of the AC generator 404 and generate an output DC voltage at the DC output voltage source 408.

In accordance with an embodiment, the multi-level rectifier 410 is one of a Vienna Rectifier, T-type Rectifier, Neutral-Point Clamped Rectifier, Active Neutral-Point Clamped Rectifier, Flying Capacitor Rectifier. The multi-level rectifier 410 may be one of the Vienna Rectifier, T-type Rectifier, Neutral-Point Clamped Rectifier, Active Neutral-Point Clamped Rectifier, or Flying Capacitor Rectifier to provide the smooth operation of the AC machine drive 402 at the low speed region without any change in switching frequency. The multi-level rectifier 410 from one of the Vienna Rectifier, T-type Rectifier, Neutral-Point Clamped Rectifier, Active Neutral-Point Clamped Rectifier, or Flying Capacitor Rectifier does not require any change in switching frequency when used with the method 100 (of FIGS. 1A and 1B).

The controller device 204 is further configured to output a set of multi-level PWM control signals to the multi-level rectifier 410.

Figure 5A:
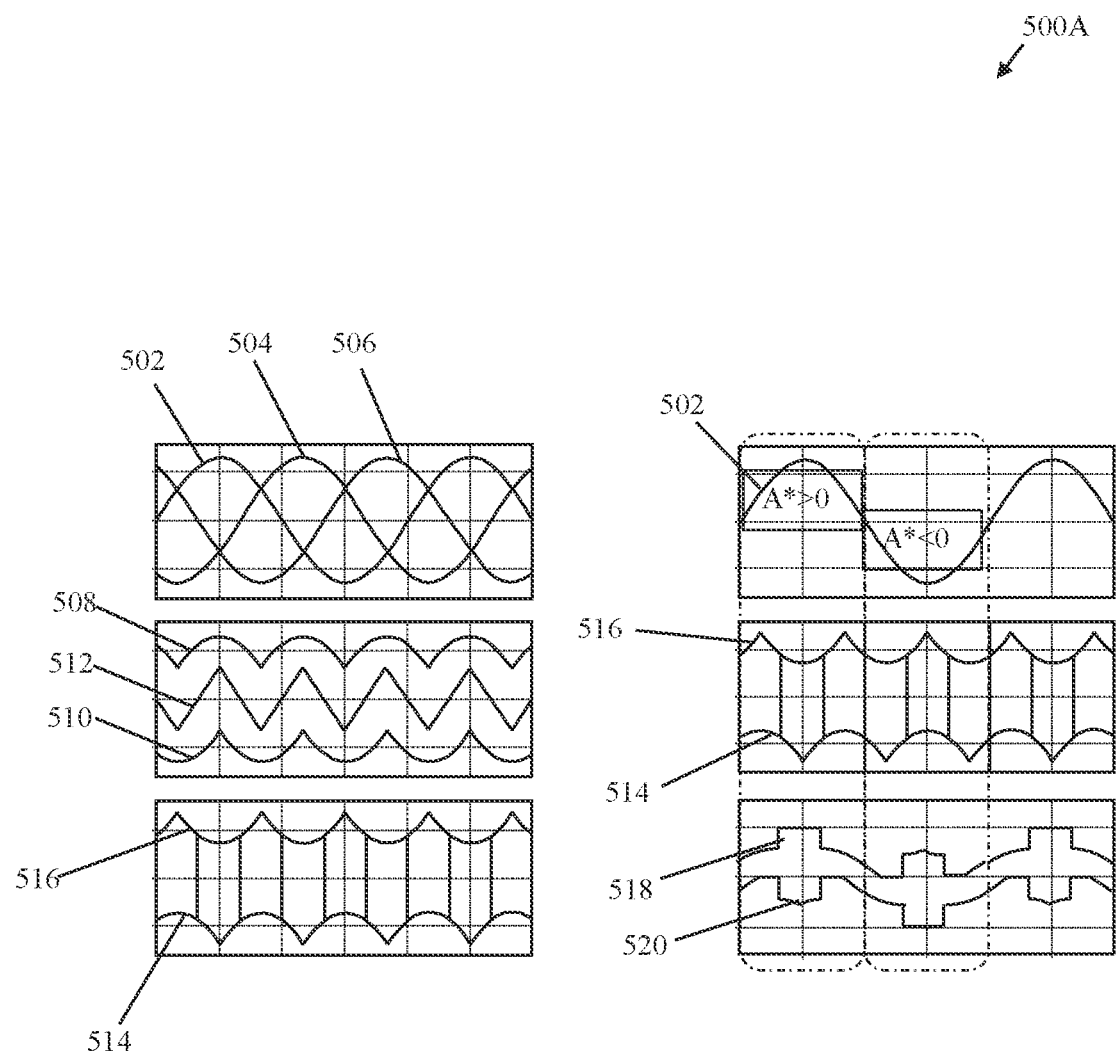
FIG. 5A is a graphical representation that illustrates generation of two different reference voltages, in accordance with an embodiment of the present disclosure.

FIG. 5A is a graphical representation that illustrates generation of two different reference voltages, in accordance with an embodiment of the present disclosure. FIG. 5A is described in conjunction with elements from FIGS. 1A, 1B, 2, 3, and 4. With reference to FIG. 5A there is shown a graphical representation 500A that illustrates generation of two different reference voltages (e.g. an upper reference and a lower reference) using the method 100 (of FIGS. 1A and 1B).

The graphical representation 500A represents a first base reference signal 502 (i.e. A*) for a first reference phase, a second base reference signal 504 (i.e. B*) for a second reference phase and a third base reference signal 506 (i.e. C*) for a third reference phase. The graphical representation 500A further represents a maximum reference 508 (also represented as max). The maximum reference 508 (i.e. max) represents a largest value which is obtained by comparing the first base reference signal 502 (i.e. A*), the second base reference signal 504 (i.e. B*) and the third base reference signal 506 (i.e. C*) with respect to each other. Similarly, the graphical representation 500A represents a minimum reference 510 (also represented as min). The minimum reference 510 (i.e. min) represents a smallest value which is obtained by comparing the first base reference signal 502 (i.e. A*), the second base reference signal 504 (i.e. B*) and the third base reference signal 506 (i.e. C*) with respect to each other. The graphical representation 500A further represents a reference sum 512 (i.e. max+min) that is obtained by addition of the maximum reference 508 (i.e. max) and the minimum reference 510 (i.e. min). The graphical representation 500A further represents a first offset 514 (i.e. offset 1), calculated as 1−max when the reference sum 512 (i.e. max+min) is positive and −1−min when the reference sum 512 (i.e. max+min) is negative. The graphical representation 500A further represents a second offset 516 (i.e. offset 2), calculated as −1−min when the reference sum 512 (i.e. max+min) is positive and 1−max when the reference sum 512 (i.e. max+min) is negative.

Further, in the graphical representation 500A, the generation of two different reference voltages (e.g. upper reference and lower reference) is described with respect to the first base reference signal 502 (i.e. A*) for sake of simplicity.

The graphical representation 500A further represents an upper reference 518 (i.e. AT) which is calculated by adding the first offset 514 (i.e. offset 1) to the first base reference signal 502 (i.e. A*) when the first base reference signal 502 (i.e. A*) is positive, according to the equation 1, and adding the second offset 516 (i.e. offset 2) when the first base reference signal 502 (i.e. A*) is negative, according to the equation 2. The graphical representation 500A further represents a lower reference 520 (i.e. AB) which is calculated by adding the second offset 516 (i.e. offset 2) to the first base reference signal 502 (i.e. A*) when the first base reference signal 502 (i.e. A*) is positive, according to the equation 3, and adding the first offset 514 (i.e. offset 1) when the first base reference signal 502 (i.e. A*) is negative, according to the equation 4. Similar to the first base reference signal 502 (i.e. A*), the upper reference (i.e. BT, CT) and the lower reference (i.e. BB, CB) for the second base reference signal 504 (i.e. B*) and the third base reference signal 506 (i.e. C*), respectively, are generated (not shown here) by following the method 100 (of FIGS. 1A and 1B).

Figure 5B:
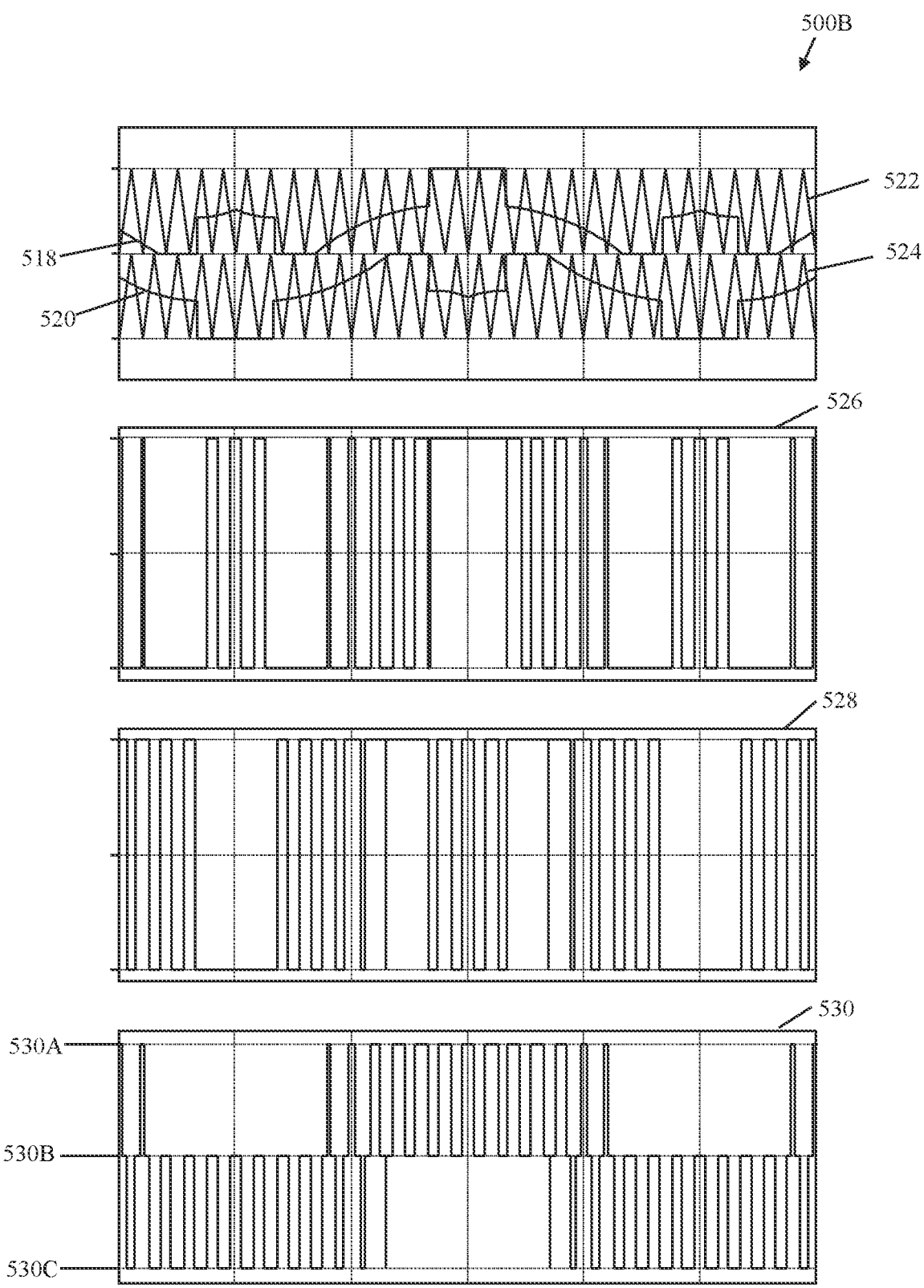
FIG. 5B is a graphical representation that illustrates generation of a set of PWM control signals for the multi-level power converter, in accordance with an embodiment of the present disclosure.

The upper reference 518 (i.e. AT) and the lower reference 520 (i.e. AB) with respect to the first base reference signal 502 (i.e. A*) are further used to generate a set of PWM control signals for the multi-level power converter (e.g. the multi-level power converter 202), described in detail, for example, in FIG. 5B.

FIG. 5B is a graphical representation that illustrates generation of a set of PWM control signals for the multi-level power converter, in accordance with an embodiment of the present disclosure. FIG. 5B is described in conjunction with elements from FIGS. 1A, 1B, 2, 3, 4, and 5A. With reference to FIG. 5B there is shown a graphical representation 500B that illustrates generation of a set of PWM control signals for the multi-level power converter 202 (of FIG. 2).

The graphical representation 500B represents a triangular upper carrier signal 522 and a triangular lower carrier signal 524. The graphical representation 500B further represents an upper PWM output 526 and a lower PWM output 528. The upper PWM output 526 is obtained by comparing the upper reference 518 (i.e. AT) to the triangular upper carrier signal 522. Similarly, the lower PWM output 528 is obtained by comparing the lower reference 520 (i.e. AB) to the triangular lower carrier signal 524. The graphical representation 500B further represents a multi-level PWM control signal 530 for the reference phase (i.e. A). The multi-level (e.g. 3 or more) PWM control signal 530 is generated by combining the upper PWM output 526 and lower PWM output 528. The multi-level PWM control signal 530 manifests three intermediate states, such as a positive state 530A (also represented as a P-state), a zero state 530B (also represented as a O-state) and a negative state 530C (also represented as a N-state). During execution of the method 100 (of FIGS. 1A and 1B), the intermediate states changes from the positive state 530A (i.e. the P-state) to the negative state 100 (i.e. the N-state) through the zero state 530B (i.e. the O-state) and from the negative state 530C (i.e. the N-state) to the positive state 530A (i.e. the P-state) through the zero state 530B (i.e. the O-state). However, in the conventional SVPWM method, changes are from the P-state to the O-state and then from the O-state to the N-state without any intersection. Therefore, the method 100 (of FIGS. 1A and 1B) results into a reduction of an output current ripple, happening close to zero-crossing region and hence, into an improved performance of the AC machine drives (e.g. the AC machine drive 302 and the AC machine drive 402).

Figure 6:
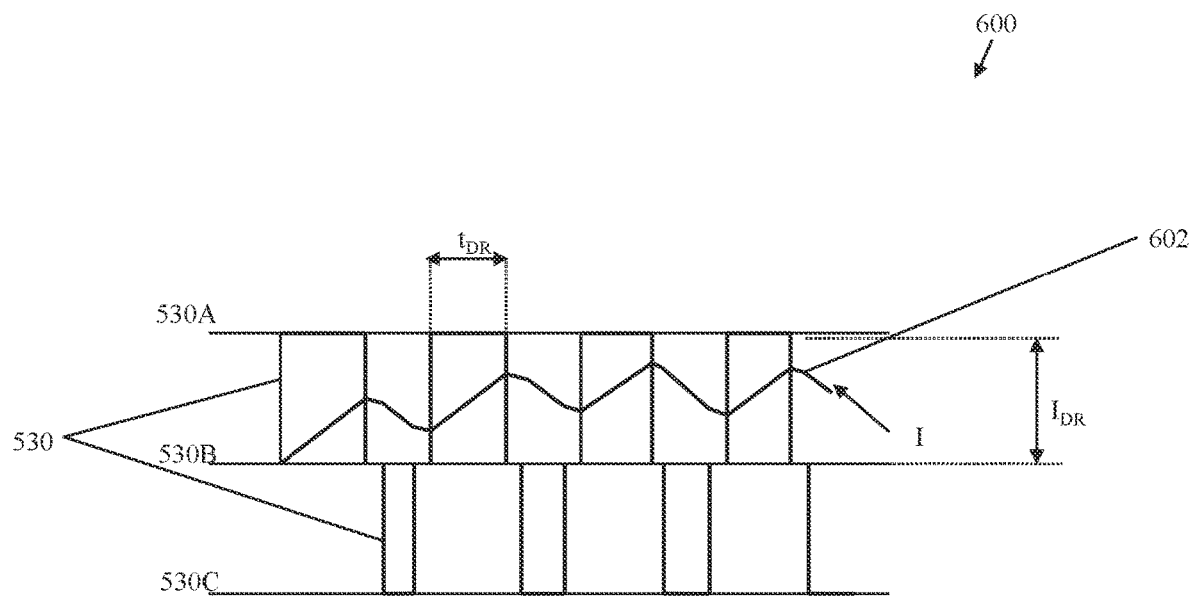
FIG. 6 is a graphical representation that illustrates generation of an output current on passing a multi-level PWM control signal through a low pass filter, in accordance with an embodiment of the present disclosure.

FIG. 6 is a graphical representation that illustrates generation of an output current on passing a multi-level PWM voltage output through a low pass filter, in accordance with an embodiment of the present disclosure. FIG. 6 is described in conjunction with elements from FIGS. 1A, 1B, 2, 3, 4, 5A, and 5B. With reference to FIG. 6 there is shown a graphical representation 600 that illustrates generation an output current on passing the multi-level PWM voltage output 530 (of FIG. 5B) through a low pass filter (not shown here).

The graphical representation 600 represents an output current 602 (also represented as I or $I_{DR}$) generated as the multi-level PWM voltage output 530 is active. An increment in the output current 602 (i.e. I) is lower for a short region(s), owing to usage of the three intermediate states (or 3 active states) such as the positive state 530A (i.e. P-state), the zero state 530B (i.e. O-state) and the negative state 530C (i.e. N-state) and similar width of the positive state 530A (i.e. P-state) and the negative state 530C (i.e. N-state). Therefore, the output current ripple cannot increase rapidly as the output current 602 (i.e. I) is always shifted back with a faster rate in comparison to the conventional SVPWM method. However, for the same region in the conventional SVPWM method, an output current (i.e. $I_{SV}$) increases rapidly, and results into a reduced performance of a conventional AC machine(s).

Figure 7:
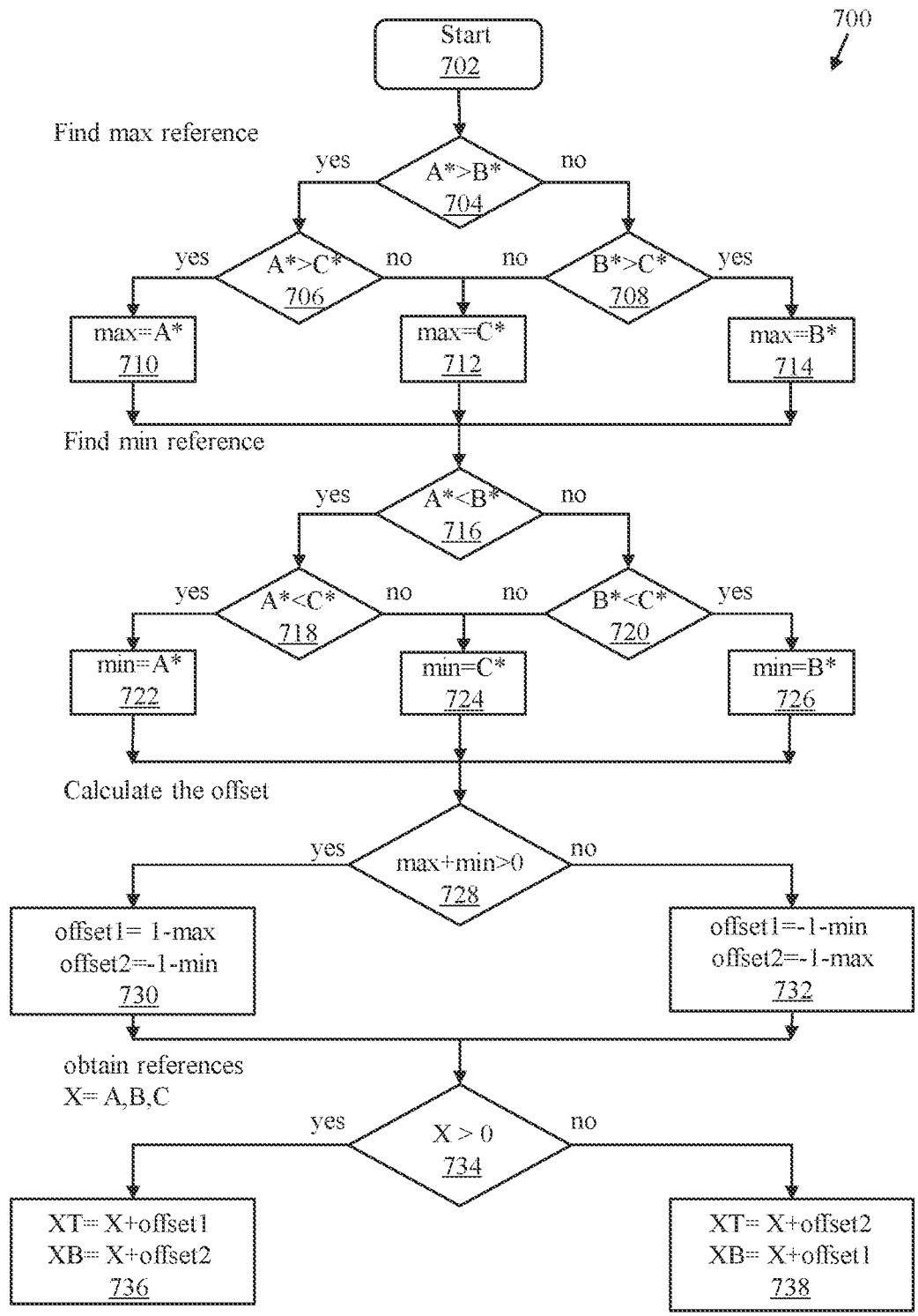
FIG. 7 is a flowchart of exemplary operations that illustrates generation of two different reference voltages, in accordance with an embodiment of the present disclosure.

FIG. 7 is a flowchart of exemplary operations that illustrates generation of two different reference voltages, in accordance with an embodiment of the present disclosure. FIG. 7 is described in conjunction with elements from FIGS. 1A, 1B, 2, 3, 4, 5A, and 5B. With reference to FIG. 7 there is shown a flowchart 700 that includes operations 702 to 738. The operations 702 to 738 in the flowchart 700 are executed by the processor 208 of the controller device 204.

At operation 702, the control of the flowchart 700 moves to start.

At operation 704, the first base reference signal 502 (i.e. A*) is compared with the second base reference signal 504 (i.e. B*). If the first base reference signal 502 (i.e. A*) has larger value than the second base reference signal 504 (i.e. B*), then, the operation 706 is executed, else, the operation 708 is executed.

At operation 706, the first base reference signal 502 (i.e. A*) is further compared with the third base reference signal 506 (i.e. C*). If the first base reference signal 502 (i.e. A*) has larger value than the third base reference signal 506 (i.e. C*), then, the operation 710 is executed, else, the operation 712 is executed.

At operation 708, the second base reference signal 504 (i.e. B*) is further compared with the third base reference signal 506 (i.e. C*). If the second base reference signal 504 (i.e. B*) has larger value than the third base reference signal 506 (i.e. C*), then, the operation 714 is executed, else, the operation 712 is executed.

At operation 710, it is found that the first base reference signal 502 (i.e. A*) has a largest value after comparison of the first base reference signal 502 (i.e. A*), the second base reference signal 504 (i.e. B*) and the third base reference signal 506 (i.e. C*). Therefore, the maximum reference 508 (i.e. max) is associated with the first base reference signal 502 (i.e. A*).

At operation 712, it is found that the third base reference signal 506 (i.e. C*) has a largest value after comparison of the first base reference signal 502 (i.e. A*), the second base reference signal 504 (i.e. B*) and the third base reference signal 506 (i.e. C*). Therefore, the maximum reference 508 (i.e. max) is associated with the third base reference signal 506 (i.e. C*).

At operation 714, it is found that the second base reference signal 504 (i.e. B*) has a largest value after comparison of the first base reference signal 502 (i.e. A*), the second base reference signal 504 (i.e. B*) and the third base reference signal 506 (i.e. C*). Therefore, the maximum reference 508 (i.e. max) is associated with the second base reference signal 504 (i.e. B*).

The operations 704 to 714 are executed in order to determine the maximum reference 508 (i.e. max) based on the first base reference signal 502 (i.e. A*), the second base reference signal 504 (i.e. B*) and the third base reference signal 506 (i.e. C*).

At operation 716, the first base reference signal 502 (i.e. A*) is compared with the second base reference signal 504 (i.e. B*). If the first base reference signal 502 (i.e. A*) has smaller value than the second base reference signal 504 (i.e. B*), then, the operation 718 is executed, else, the operation 720 is executed.

At operation 718, the first base reference signal 502 (i.e. A*) is further compared with the third base reference signal 506 (i.e. C*). If the first base reference signal 502 (i.e. A*) has smaller value than the third base reference signal 506 (i.e. C*), then, the operation 722 is executed, else, the operation 724 is executed.

At operation 720, the second base reference signal 504 (i.e. B*) is further compared with the third base reference signal 506 (i.e. C*). If the second base reference signal 504 (i.e. B*) has smaller value than the third base reference signal 506 (i.e. C*), then, the operation 726 is executed, else, the operation 724 is executed.

At operation 722, it is found that the first base reference signal 502 (i.e. A*) has a smallest value after comparison of the first base reference signal 502 (i.e. A*), the second base reference signal 504 (i.e. B*) and the third base reference signal 506 (i.e. C*). Therefore, the minimum reference 510 (i.e. min) is associated with the first base reference signal 502 (i.e. A*).

At operation 724, it is found that the third base reference signal 506 (i.e. C*) has a smallest value after comparison of the first base reference signal 502 (i.e. A*), the second base reference signal 504 (i.e. B*) and the third base reference signal 506 (i.e. C*). Therefore, the minimum reference 510 (i.e. min) is associated with the third base reference signal 506 (i.e. C*).

At operation 726, it is found that the second base reference signal 504 (i.e. B*) has a smallest value after comparison of the first base reference signal 502 (i.e. A*), the second base reference signal 504 (i.e. B*) and the third base reference signal 506 (i.e. C*). Therefore, the minimum reference 510 (i.e. min) is associated with the second base reference signal 504 (i.e. B*).

The operations 716 to 726 are executed in order to determine the minimum reference 510 (i.e. min) based on the first base reference signal 502 (i.e. A*), the second base reference signal 504 (i.e. B*) and the third base reference signal 506 (i.e. C*).

At operation 728, it is checked that the reference sum 512 (i.e. max+min) is positive or negative. If the reference sum 512 (i.e. max+min) is positive, the operation 730 is executed, else, the operation 732 is executed.

At operation 730, the first offset 514 (i.e. offset 1) is computed as 1−max (i.e. the maximum reference 508) when the reference sum 512 (i.e. max+min) is positive and the second offset 516 (i.e. offset 2) is computed as −1−min (i.e. the minimum reference 510) when the reference sum 512 (i.e. max+min) is positive.

At operation 732, the first offset 514 (i.e. offset 1) is computed as −1−min (i.e. the minimum reference 510) when the reference sum 512 (i.e. max+min) is negative and the second offset 516 (i.e. offset 2) is computed as 1−max (i.e. the maximum reference 508) when the reference sum 512 (i.e. max+min) is negative.

The operations 728 to 732 are executed in order to determine the first offset 514 (i.e. offset 1) and the second offset 516 (i.e. offset 2) based on the maximum reference 508 (i.e. max), the minimum reference 510 (i.e. min) and the reference sum 512 (i.e. max+min).

At operation 734, it is checked that each of the first base reference signal 502 (i.e. A*), the second base reference signal 504 (i.e. B*) and the third base reference signal 506 (i.e. C*) is positive or negative. If each of the first base reference signal 502 (i.e. A*), the second base reference signal 504 (i.e. B*) and the third base reference signal 506 (i.e. C*) is positive, then, the operation 736 is executed, else, the operation 738 is executed.

At operation 736, the upper reference 518 (i.e. AT, BT, CT) is generated by adding the first offset 514 (i.e. offset 1) to each of the first base reference signal 502 (i.e. A*), the second base reference signal 504 (i.e. B*) and the third base reference signal 506 (i.e. C*) and the lower reference 520 (i.e. AB, BB, CB) is generated by adding the second offset 516 (i.e. offset 2) to each of the first base reference signal 502 (i.e. A*), the second base reference signal 504 (i.e. B*) and the third base reference signal 506 (i.e. C*), when each of the base reference signals 502,504 and 506 is positive.

At operation 738, the upper reference 518 (i.e. AT, BT, CT) is generated by adding the second offset 516 (i.e. offset 2) to each of the first base reference signal 502 (i.e. A*), the second base reference signal 504 (i.e. B*) and the third base reference signal 506 (i.e. C*), and the lower reference 520 (i.e. AB, BB, CB) is generated by adding the first offset 514 (i.e. offset 1) to each of the first base reference signal 502 (i.e. A*), the second base reference signal 504 (i.e. B*) and the third base reference signal 506 (i.e. C*), when each of the base reference signals 502,504 and 506 is negative.

Figure 8A:
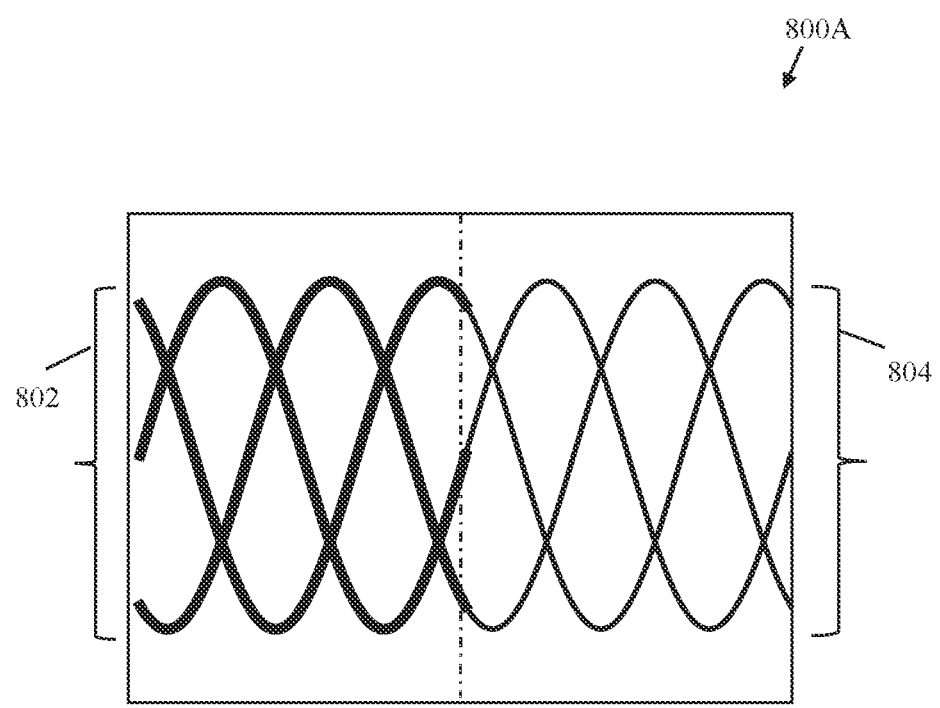
FIG. 8A is a graphical representation that illustrates reduction of an output current ripple of the AC machine drive after a double reference PWM (DRPWM) method is applied, in accordance with an embodiment of the present disclosure.

FIG. 8A is a graphical representation that illustrates reduction of an output current ripple of the AC machine drive after a double reference PWM (DRPWM) method is applied, in accordance with an embodiment of the present disclosure. FIG. 8A is described in conjunction with elements from FIGS. 1A, 1B, 2, 3, 4, 5A, 5B, 6, and 7. With reference to FIG. 8A there is shown a graphical representation 800A that illustrates reduction of an output current ripple of the AC machine drive (e.g. the AC machine drive 302 or the AC machine drive 402) after the DRPWM method is applied to the AC machine drive. The DRPWM method corresponds to the method 100 (of FIGS. 1A and 1B).

The graphical representation 800A represents an output current 802 generated by use of the conventional SVPWM method and an output current 804 generated by use of the method 100 (i.e. the DRPWM method). A ripple amplitude of the output current 804 is reduced in comparison with a ripple amplitude of the output current ripple 802. The output current 804 is generated by use of the method 100 (i.e. the DRPWM method) without any change in topology or switching frequency of the multi-level power converter 202 in contrast to the conventional SVPWM method, where change is required in topology or switching frequency of the conventional power converter to reduce the ripple amplitude of the output current 802.

Figure 8B:
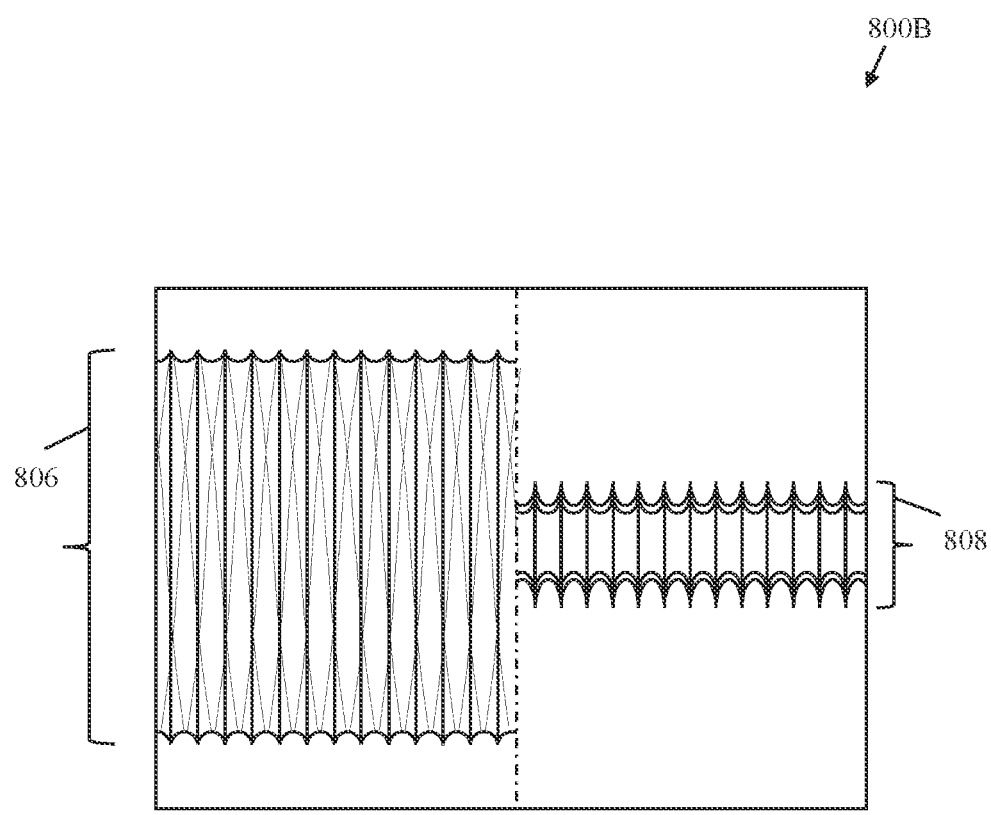
FIG. 8B is a graphical representation that illustrates reduction of a torque ripple of the AC machine drive after the DRPWM method is applied, in accordance with an embodiment of the present disclosure.

FIG. 8B is a graphical representation that illustrates reduction of a torque ripple of the AC machine drive after the DRPWM method is applied, in accordance with an embodiment of the present disclosure. FIG. 8B is described in conjunction with elements from FIGS. 1A, 1B, 2, 3, 4, 5A, 5B, 6, 7, and 8A. With reference to FIG. 8B there is shown a graphical representation 800B that illustrates reduction of a torque ripple of the AC machine drive (e.g. the AC machine drive 302 or the AC machine drive 402) after the method 100 (i.e. the DRPWM method) is applied to the AC machine drive.

The graphical representation 800B represents a torque ripple 806 generated by applying the conventional SVPWM method to the conventional AC machine and a torque ripple 808 generated by applying the method 100 (i.e. the DRPWM method) to either the AC machine drive 302 or the AC machine drive 402. The torque ripple 808 is reduced in comparison the torque ripple 806. The torque ripple 808 is generated by use of the method 100 (i.e. the DRPWM method) without any change in topology or switching frequency of the multi-level power converter 202 in contrast to the conventional SVPWM method, where change is required in topology or switching frequency of the conventional power converter to reduce the torque ripple 806.

Figure 8C:
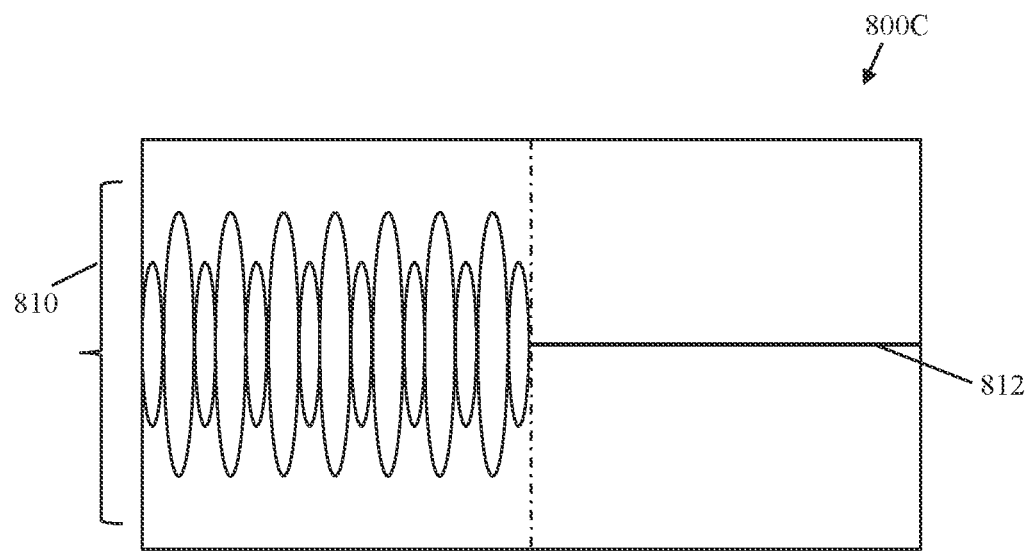
FIG. 8C is a graphical representation that illustrates reduction of a neutral point voltage of the multilevel VSI after the DRPWM method is applied, in accordance with an embodiment of the present disclosure.

FIG. 8C is a graphical representation that illustrates reduction of a neutral point voltage of the multilevel VSI after the DRPWM method is applied, in accordance with an embodiment of the present disclosure. FIG. 8C is described in conjunction with elements from FIGS. 1A, 1B, 2, 3, 4, 5A, 5B, 6, 7, 8A, and 8B. With reference to FIG. 8C there is shown a graphical representation 800C that illustrates reduction of a neutral point voltage of the multilevel VSI (e.g. the AC machine drive 302 or the multilevel VSI 402) after the method 100 (i.e. the DRPWM method) is applied to the multilevel VSI.

The graphical representation 800C represents a neutral point oscillation 810 generated by applying the conventional SVPWM method to the conventional multilevel VSI and a neutral point oscillation 812 generated by applying the method 100 (i.e. the DRPWM method) to either the multi-level VSI connected to AC machine drive 302 or the multilevel VSI connected to AC machine drive 402. The neutral point oscillation 810 is an oscillation of voltages across capacitors connected from positive and negative buses to a neutral point. The neutral point oscillation 812 is reduced substantially in comparison the neutral point oscillation 810. The neutral point oscillation 812 is generated by use of the method 100 (i.e. the DRPWM method) without any change in topology or switching frequency of the multi-level power converter 202 in contrast to the conventional SVPWM method, where change is required in components sizes or additional compensation methods of the neutral point are required to reduce the neutral point oscillation 810.

In this way, the method 100 improves the current quality by providing the reduced output current ripple 804, improves the torque quality by providing the reduced torque ripple 808 and the reduced neutral point oscillation 812 when applied to either the AC machine drive 302 or the AC machine drive 402 without any change in topology and switching frequency of the multi-level power converter 202.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural. The word "exemplary" is used herein to mean "serving as an example, instance or illustration". Any embodiment described as "exemplary" is not necessarily to be construed as preferred or advantageous over other embodiments or to exclude the incorporation of features from other embodiments. The word "optionally" is used herein to mean "is provided in some embodiments and not provided in other embodiments". It is appreciated that certain features of the present disclosure, which are, for clarity, described in the context of separate embodiments, may also be provided in combination in a single embodiment. Conversely, various features of the invention, which are, for brevity, described in the context of a single embodiment, may also be provided separately or in any suitable combination or as suitable in any other described embodiment of the disclosure.

What is claimed is:

1. A method, comprising:
    generating a base reference signal for each of three or more reference phases;
    determining a maximum reference (max) and a minimum reference (min) based on the base reference signal generated for each of the three or more reference phases;
    calculating a reference sum of the maximum reference and the minimum reference;
    generating a first offset by calculating the first offset to be 1−max when the reference sum is positive and −1−min when the reference sum is negative;
    generating a second offset by calculating the second offset to be −1−min when the reference sum is positive and 1−max when the reference sum is negative;
    for each of the three or more reference phases, performing the following, to obtain a set of multi-level pulse-width modulation (PWM) control signals:
        generating an upper reference by adding the first offset to the base reference signal when the signal is positive and adding the second offset when the signal is negative;
        generating a lower reference by adding the second offset to the base reference signal when the signal is positive and adding the first offset when the signal is negative;
        comparing the upper reference to a triangular upper carrier signal to generate an upper PWM output;
        comparing the lower reference to a triangular lower carrier signal to generate a lower PWM output; and
        combining the upper PWM output and lower PWM output to generate a multi-level PWM control signal for the respective reference phase that is comprised in the set of multi-level PWM control signals; and
    outputting the set of multi-level PWM control signals generated for the three or more reference phases to a multi-level power converter.

2. The method of claim 1, wherein calculating the maximum reference comprises:
    comparing a first base reference signal for a first reference phase of the three or more reference phases to a second base reference signal for a second reference phase of the three or more reference phases; and
    when it is determined according to the comparing that the first base reference signal is larger than the second base reference signal, comparing the first base reference signal with a third base reference signal for a third reference phase of the three or more reference phases and returning the larger value; and
    when it is determined according to the comparing that the second base reference signal is larger than the first base reference signal, comparing the second base reference signal with the third base reference signal and returning the larger value.

3. The method of claim 1, wherein calculating the minimum reference comprises:
    comparing a first base reference signal for a first reference phase of the three or more reference phases to a second base reference signal for a second reference phase of the three or more reference phases; and when it is determined according to the comparing that the first base reference signal is smaller than the second base reference signal, comparing the first base reference signal with a third base reference signal for a third reference phase and returning the smaller value; and when it is determined according to the comparing that the second base reference signal is smaller than the first base reference signal, comparing the second base reference signal with the third base reference signal and returning the smaller value.

4. The method of claim 1, wherein the three or more reference phases comprise 0 degrees, 120 degrees and 240 degrees.

5. The method of claim 1, wherein the base reference signal generated for each of three or more reference phases is a sine wave.

6. The method of claim 1, wherein the base reference signal generated for each of three or more reference phases is a space vector signal.

7. The method of claim 1, wherein generating the base reference signals for each of three or more reference phases comprises:
receiving a speed reference for an alternating current (AC) machine drive; and
determining an amplitude for the base reference signals based on the received speed reference.

8. A non-transitory computer-readable medium comprising instructions which, when executed by a processor, cause the processor to execute the method of claim 1.

9. A controller device for a multi-level power converter, comprising circuitry configured to:
generate a base reference signal for each of three or more reference phases;
determine a maximum reference (max) and a minimum reference (min) based on the base reference signal generated for each of the three or more reference phases;
calculate a reference sum of the maximum reference and the minimum reference;
generate a first offset by calculating the first offset to be as 1−max when the reference sum is positive and −1−min when the reference sum is negative;
generate a second offset by calculating the second offset to be −1−min when the reference sum is positive and 1−max when the reference sum is negative;
for each of the three or more reference phases, perform the following, to obtain a set of multi-level pulse-width modulation (PWM) control signals:
generate an upper reference by adding the first offset to the base reference signal when the signal is positive and adding the second offset when the signal is negative;
generate a lower reference by adding the second offset to the base reference signal when the signal is positive and adding the first offset when the signal is negative;
compare the upper reference to a triangular upper carrier signal to generate an upper PWM output;
compare the lower reference to a triangular lower carrier signal to generate a lower PWM output; and
combine the upper PWM output and lower PWM output to generate a multi-level PWM control signal for the respective reference phase that is comprised in the set of multi-level PWM control signals.

10. An alternating current (AC) machine drive comprising:
an AC motor with three or more phase input terminals;
a direct current (DC) input voltage source;
a multi-level voltage source inverter (VSI) configured to receive an input DC voltage from the DC input voltage source and generate an AC driving signal for each of the three or more phase input terminals; and
the controller device of claim 9, further comprising circuitry configured to output the set of PWM control signals to the multi-level VSI.

11. An alternating current (AC) machine drive comprising:
an AC generator comprising three or more phase output terminals;
a direct current (DC) output voltage source;
a multi-level rectifier configured to receive an input AC voltage from each of the three or more phase output terminals of the AC generator and generate an output DC voltage at the DC output voltage source; and
the controller device of claim 9, further comprising circuitry configured to output the set of multi-level PWM control signals to the multi-level rectifier.

12. The controller device of claim 9, wherein calculating the maximum reference comprises:
comparing a first base reference signal for a first reference phase of the three or more reference phases to a second base reference signal for a second reference phase of the three or more reference phases; and
when it is determined according to the comparing that the first base reference signal is larger than the second base reference signal, comparing the first base reference signal with a third base reference signal for a third reference phase of the three or more reference phases and returning the larger value; and
when it is determined according to the comparing that the second base reference signal is larger than the first base reference signal, comparing the second base reference signal with the third base reference signal and returning the larger value.

13. The controller device of claim 9, wherein calculating the minimum reference comprises:
comparing a first base reference signal for a first reference phase of the three or more reference phases to a second base reference signal for a second reference phase of the three or more reference phases; and
when it is determined according to the comparing that the first base reference signal is smaller than the second base reference signal, comparing the first base reference signal with a third base reference signal for a third reference phase and returning the smaller value; and
when it is determined according to the comparing that the second base reference signal is smaller than the first base reference signal, comparing the second base reference signal with the third base reference signal and returning the smaller value.

14. The controller device of claim 9, wherein the three or more reference phases comprise 0 degrees, 120 degrees and 240 degrees.

15. The controller device of claim 9, wherein the base reference signal generated for each of three or more reference phases is a sine wave.

16. The controller device of claim 9, wherein the base reference signal generated for each of three or more reference phases is a space vector signal.

17. The controller device of claim 9, wherein generating the base reference signals for each of three or more reference phases comprises:
 receiving a speed reference for an alternating current (AC) machine drive; and
 determining an amplitude for the base reference signals based on the received speed reference.

18. The AC machine drive of claim 10, wherein the multi-level VSI is a neutral-point clamped VSI, a T-type VSI, or a flying capacitor VSI.

19. The AC machine drive of claim 10, wherein the AC machine drive is configured for an electric vehicle (EV) traction drive operation.

20. The AC machine drive of claim 11, wherein the multi-level rectifier is one of a Vienna Rectifier, T-type Rectifier, Neutral-Point Clamped Rectifier, Active Neutral-Point Clamped Rectifier, or Flying Capacitor Rectifier.

\* \* \* \* \*